(12) United States Patent
Miyagawa

(10) Patent No.: US 6,756,984 B1
(45) Date of Patent: Jun. 29, 2004

(54) OBJECT DISPLAYING METHOD, A RECORDING MEDIUM AND GAME APPARATUS

(75) Inventor: Yoshiyuki Miyagawa, Tokyo (JP)

(73) Assignee: Squire Enix Co., Ltd., Tokyo (JP)

( * ) Notice: Subject to any disclaimer, the term of this patent is extended or adjusted under 35 U.S.C. 154(b) by 607 days.

(21) Appl. No.: 09/605,646

(22) Filed: Jun. 29, 2000

(30) Foreign Application Priority Data

Nov. 17, 1999 (JP) .......................................... 11-327554

(51) Int. Cl.[7] .............................................. G06T 15/00
(52) U.S. Cl. ...................................................... 345/473
(58) Field of Search ................................ 345/473–475

(56) References Cited

FOREIGN PATENT DOCUMENTS

| JP | 2812674 | 7/1998 |
|---|---|---|
| JP | 10198819 | 7/1998 |

OTHER PUBLICATIONS

Reynolds "ComputerAnimation with Scripts and Actors" ACM Computer Graphics, vol. 16, No. 3, Jul. 1982.*
Reynolds "Flocks, Herds, and Schools: A Distributed Behavioral Model" ACM Computer Graphics, vol. 21, No. 4, Jul. 1987I.*

English Language abstract of JP–2812674.
English Language abstract of JP–10–198819.
Director 7 Super Manual, pp. 2–23, published by Ohmsha, Ltd., Apr. 21, 1999 along with an English Language Translation.

* cited by examiner

*Primary Examiner*—Almis R. Jankus
(74) *Attorney, Agent, or Firm*—Greenblum & Bernstein, P.L.C.

(57) ABSTRACT

The present invention provides an object displaying method, a recording medium and game apparatus whereby generation, movement and extinction of a plurality of objects constituting an image by using a common parameter group are realized. When a new scene starts, respective values in an object parameter group which is commonly designated to all objects appearing in the scene are analyzed on every object, and then type, generation conditions, generation position requirements, movement mode and image requirements, etc., are analyzed. In accordance with the generation condition of the object, whether or not the object is to be generation is determined. When the object is generated, the generation position is determined by the generation position requirements of the object. The position of the object after being generated is determined by the movement requirements of the object. It is judged by the display duration of the object whether the object should be extinguished or not.

10 Claims, 12 Drawing Sheets

60: OBJECT PARAMETER GROUP

| OBJECT NAME | 61 |
| GENERATION POSITION COORDINATES | 62 |
| RANDOM GENERATION RANGE | 63 |
| DISPLAY DURATION | 64 |
| GENERATION INTERVAL | 65 |
| MOVING VECTOR | 66 |
| RANDOM MOVING RANGE | 67 |
| COLOR | 68 |
| RANDOM COLOR CHANGE RANGE | 69 |
| MOTION DATA APPOINTMENT INFORMATION | 70 |
| POLYGON APPOINTMENT INFORMATION | 71 |
| OBJECT GENERATION TIME | 72 |

BIRD

STATE A → MOVE UP → STATE B → MOVE TO RIGHT → STATE C

CLOUDS

STATE A → MOVE TO LEFT → STATE B → MOVE TO LEFT → STATE C

WATERFALL

STATE A — FIRST RIPPLE IS GENERATED → STATE B — FIRST RIPPLE MOVES, SECOND RIPPLE IS GENERATED → STATE C

OBJECT DISPLAYING METHOD, A RECORDING MEDIUM AND GAME APPARATUS

BACKGROUND OF THE INVENTION

1. Field of the Invention

The present invention relates to a storage medium stored with a program for generating a group of objects displayed for a video game, an object displaying method and a game apparatus.

2. Description of the Prior Art

Recently, video games in which sophisticated technologies are used are being developed. In these games, display objects (hereinafter, referred to as object for simplification) such as persons, machines, tools, buildings and backgrounds, etc. positioned in a three-dimensional space are displayed on a display and the objects are moved in response to a player's operations. Each object is represented as a collective of a plurality of polygons and an image including a plurality of objects is generated. In video games, the image generation process is repeated several tens of times a second, several tens of static frame images (hereinafter, each static image will be referred to as frame image) are generated.

Recently, in addition to characters, the contents of images are also being displayed full of variety. For example, not only static objects such as mountains, ground or buildings, etc. but also objects which move over time such as waterfalls or clouds are displayed or, sometimes flying objects such as birds are also displayed.

The movement of objects comprising images are full of variety, and generation conditions, generation position requirements, movement mode, display duration of the objects, and data used to generate images representing respective objects are different depending on each object. For example, to represent the changes of postures of a bird character, it is necessary to move a plurality of joints which compose the character, and as with a player character or an enemy character, motion data is used to represent its movement.

It is desirable that a waterfall is displayed so that the flow of water or splashes change as time passes. That is, generation conditions are specified with respect to the waterfall and when the conditions are met, the object is generated. Sometimes generation position is also altered randomly over time.

It is desirable that clouds are displayed by dynamically changing images so that they are generated over time, and generation positions are changed randomly over time, or they disappear over time, moreover, their configuration is changed over time.

In conventional arts, in order to generate an image of a variety of objects to be displayed on the screen, for each object, an object image generation program for generating an image of the object is used. This program generates, moves or extinguishes the object in accordance with the image requirements such as generation conditions, generation position, movement mode, color and data to be used with respect to the corresponding object, and generates images representing objects which have been generated or moved. As images for each object are generated, input data to be given to the corresponding object image generation program are different depending on each object.

In a conventional art as described above, a plurality of object image generation programs for generating a plurality of different objects are loaded at a time in the main memory (generally, this is known as random access memory (RAM)) contained in a computer within a game apparatus, and executed. For executing each program, a work area for each program is secured and used within the RAM.

In recent video games, the total number of objects to be used is large, and it is very possible to increase their number. As a result, the capacity of RAM actually required for the object image generation program will become larger and it is still very possible to increase it from now on.

On the other hand, recent games are coming to use larger amounts of data and there is a tendency towards a greater variety of game images being represented. For example, configuration of each object is likely to become more complicated. The size of data for representing configuration and other object-related data used for each object is becoming larger. It is anticipated that the size of object-related data will become larger in the future.

As described above, in said conventional arts, the capacity of RAM required to execute a program for generating a plurality of objects is large. As a result, it has become difficult to secure RAM area for storing large amounts of data required for representing complicated object images. It is estimated that this problem will be more serious.

Therefore, the object of the present invention is to provide an object displaying method, a storage medium and a game apparatus using the above method appropriate to display a plurality of object images according to movement using a smaller capacity of the RAM.

SUMMARY OF THE INVENTION

In order to solve the problem described above, a game apparatus according the present invention provides a game apparatus for displaying objects in a virtual space at a predetermined period on a screen, comprising a storage means for storing movement information wherein a schedule from the generation to extinction of each of a plurality of objects of different types and movement pattern are defined, a judgement means for judging display timing of each object corresponding to the progression of a game by referring to movement information stored in said storage means, an acquisition means for acquiring the movement information of each object judged as being at display timing by said judgement means from said storage means, a physical simulation means for simulating the movement of each object in accordance with the schedule and movement pattern defined by the movement information acquired by said acquisition means, and a display means for displaying the image of each object in accordance with the movement simulated by said physical simulation means.

According to the game apparatus according to the present invention, by preparing movement information for each of the plurality of objects, it become possible to control the generation position of each object, whereby it becomes unnecessary to prepare a movement program for each object. As a result, it becomes possible to move the plurality of objects on a screen using a smaller amount of memory.

To be more concrete, the storage means stores the movement information including the generation position, direction of movement and amount of movement of objects defined as a movement pattern, said physical simulation means generates said object at a generation position defined by the movement information acquired by said acquisition means and calculates a position of said object at every predetermined cycle, in a case where said object is moved in a direction of movement defined by means of said movement information by a amount of movement defined by means of said movement information.

The object displaying method according to the present invention comprises an object displaying method for displaying a plurality of objects of different types in virtual space at a predetermined period on a screen includes a judgement step, wherein the display timing of each object is judged in response to the progression of a game by referring to movement information in which a schedule from generation to extinction and a movement pattern of the plurality of objects of different types are defined, respectively, a physical simulation step, wherein the movement of each object is simulated in accordance with the schedule and movement pattern defined by the movement information of the object which is judged as being at display timing in said judgement step and a display step, wherein an image of each object is displayed in accordance with the said movement which is simulated in the physical simulation step.

To be more concrete, in said movement information, the generation position, direction of movement and amount of movement of an object are defined as a movement pattern and in said simulation step, said object is generated at a generation position defined by said movement information acquired in said acquisition step, and the position of the object in a case where the object is moved in the direction of movement defined by said movement information by the amount of movement defined in the movement information is calculated at every said cycle.

The storage medium according to the present invention comprises a computer-readable storage medium stored with a program for displaying a plurality of objects of different types in virtual space at a predetermined period on a screen, wherein said program is programmed so as to make a computer execute a judgement step in which display timing of each object is judged by referring to movement information wherein a schedule from the generation to extinction and a movement pattern of a plurality of objects of different types are defined, respectively and a simulation step in which movement of each said object is simulated in accordance with the schedule and movement pattern defined by the movement information of said object which is judged as being at display timing, and display step in which an image of each object is simulated in accordance with the simulated movement.

To be more concrete, in said movement information, the generation position, direction of movement and amount of movement of an object are defined as a movement pattern and in said physical simulation step, said object is generated at a generation position defined by said movement information acquired in said acquisition step and the position of the object in a case where the object is moved in the direction of movement defined by said relevant movement information by the amount of movement defined in the movement information is calculated at every said cycle.

Another preferable embodiment of the recording medium relating to the invention is a computer-readable recording medium storing a program to be executed for a video game by a computer, wherein the program is commonly determined for a group of objects positioned in a three-dimensional space of a series of frame images displayed for the video game, and is programmed to execute an analysis step for analyzing time requirements, positional requirements, and image requirements relevant to at least display time, display positions, and images of said objects based on a plurality of parameters specified for the objects which specify a plurality of kinds of information to be commonly used for generation of the group of objects or used for generation of a part of images of the group of objects, a judgement step for judging display positions of the objects based on the positional requirements of the objects analyzed in the analysis step when judgement as to whether or not the objects should be displayed by frame images to be generated is made based on the time requirements of the objects analyzed in the analysis step in the case where the frame images should be generated and the objects are judged to be displayed, and a generation step for generating images representing the objects positioned at the object display position judged in the judgement step in accordance with the image requirements of the objects analyzed in the analysis step when the objects are judged to be displayed in the judgement step.

To be more concrete, in said judgement step, as for an object in said group of objects which is not displayed yet by a frame image generated immediately before said frame image to be displayed is generated, the object is judged to be newly displayed or not based on the time requirements of the object which has been analyzed in the analysis step, if it is judged to be displayed in said judgement step, a displaying position of the object is distinguished based on the positional requirements of the relevant object which has been analyzed by said analysis step, and as for an object in said group of objects which has been already displayed by the frame image immediately before the object, it is judged whether the object is designated to move or not by the positional requirements of said object analyzed in the analysis step, if said positional requirements of the object designates the object to move, a new displaying position of the object is determined based on the movement designated by said positional requirements and the position of the relevant object in a case when the object is displayed in said frame generated immediately before.

To be more concrete, in the judgement step, as for said object in said a group of objects, which has been already displayed by a frame image generated immediately before, it is judged whether the time requirements of the object analyzed in the analysis step specifies limited display duration of the object or not, and if said time requirements of the object specifies limited display duration, it is judged whether a display of the relevant object should be extinguished based on the limited display duration specified by said time requirements, and if it is judged to be extinguished, an image representing the object is not generated.

To be further concrete, steps from said analysis step to said judgement step are executed by a common part of the program for said group of the objects included in said program.

According to the present invention, if schedules and movement patterns for a plurality of respective objects are being regulated, unified control is enabled for respective objects, which makes it unnecessary to prepare movement programs for each object. As a result, a plurality of objects can be displayed with a smaller memory on the display screen.

The present disclosure relates to subject matter contained in Japanese Patent Application No. HEI 11-327554, filed on Nov. 17, 1999, the disclosure of which is expressly incorporated hereinby reference in its entirety.

BRIEF DESCRIPTION OF THE DRAWINGS

The foregoing and other features and advantages of the present invention will become more readily more appreciated as the same becomes better understood by reference to the following detailed description when taken into conjunction with the accompanying drawings wherein.

DESCRIPTION OF THE PREFERRED EMBODIMENT

Figure 1:
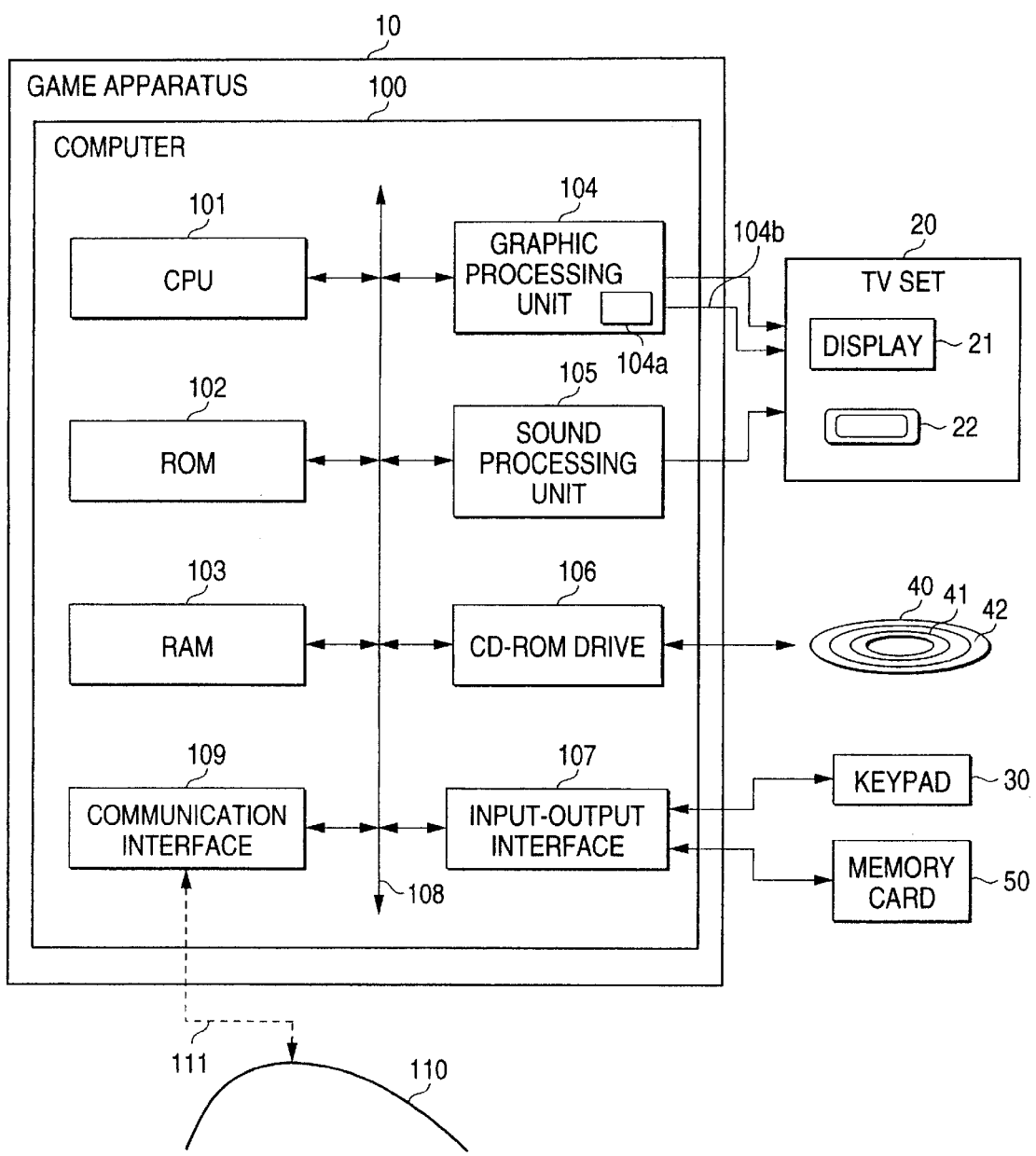
FIG. 1 is a schematic view of a game system used by the game apparatus equipped with a built-in computer relating to the present invention.

Hereinafter, referring to the drawings, the preferred embodiment of an object displaying method of the invention, a program storage medium and a game apparatus which use the above method will be described.

As shown in FIG. 1, the game system 1 comprises, for example, a game apparatus 10 which allows a CD-ROM (Compact Disk-Read Only Memory) 40 which stores, for example, a computer game program 41 relevant to the present invention, to be mounted thereto or dismounted therefrom freely, a display apparatus 20 and an input device 30 which allows a player to operate. The game apparatus 10 is a home game apparatus which includes a computer 100 housed in a box-formed case.

A player pushes an open-close button (not illustrated) on the game apparatus 10 to open the open-close cover (not illustrated), and then, for example, mounts the CD-ROM 40 into the inside thereof. The game apparatus 10 starts to execute the computer game program stored in the CD-ROM 40. The display apparatus 20 and the input device 30 are connected to the game apparatus 10 via cables.

The game apparatus 10 has a card slot (not illustrated). The card slot allows a memory card 50, which is an auxiliary external storage medium, to be inserted therein. The player is allowed to freely store data concerning a player character and an enemy character or data concerning the progress of the game program which is necessary when the player restarts the game later. When the player restarts the game by using the memory card 50, the game apparatus 10 restarts the game from the point where the game has been previously interrupted.

The display apparatus 20 receives video signals and audio signals from the game apparatus 10. The display apparatus 20 processes the video signals and displays images on the screen 21, while it outputs sound corresponding to the received audio signals via a speaker 22 provided to the display apparatus 20. The display apparatus 20 comprises, for example, a television set.

The input device 30 is, generally, also called a controller, and provided with a plurality of buttons and other control devices (not illustrated) for the user to operate therewith. For example, a group of the directional keys comprising four keys for moving the cursor displayed on the screen 21 leftward, rightward, upward and downward, a select button, a start button, the first button, the second button, the third button and the fourth button are provided. The game system applied with the present invention is not limited to the game system shown in the figure or the like.

The computer 100 comprises, for example, a central processing unit (CPU) 101, a read only memory (ROM) 102 for storing command rows and data necessary for the CPU 101 to execute the commands of the program, a random access memory (RAM) 103 which temporarily stores the game program to be executed and data to be used by the game program and comprises the main memory, a graphic processing unit 104, a sound processing unit 105, a CD-ROM drive 106 into which a CD-ROM 40 is loaded, an input-output interface 107, a communication interface 109 and a bus 108 for connecting the circuits thereof.

The CPU 101 reads and executes the commands of the program stored in the RAM 103 and controls each circuit within the computer in accordance with the commands as well as controls the execution of the program corresponding to the input operation made by the player from the input device 30 via the input-output interface 107. When executing the program, the CPU 101 executes command rows stored in the ROM 102 in a timely manner.

The graphic processing unit 104 includes a video RAM (VRAM), (104a), comprising a frame buffer (not illustrated) therein, and depict images of an object which consists of a polygon represented on the frame buffer in accordance with the commands given from the CPU 101. Also, the graphic processing unit 104 generates video signals, for example, television signals corresponding to the image information stored in the frame buffer and outputs them to the video circuit (not illustrated) within the display apparatus 20.

The frame buffer comprises a pair of frame buffers. A plurality of images of objects which compose an identical frame image are stored in one of said pair of the frame buffers. When a frame image has finished to be generated, the next frame image is stored in the other one of said pair of frame buffers. Thus, a plurality of frame images are stored in said pair of frame buffers, alternately.

In the pair of frame buffers, from a frame buffer other than one which is currently used for storing a frame image, the latest stored frame image is read out. The frame buffer to be read out is switched in synchronization with a vertical synchronous signal 104b from the display apparatus 20, while a new frame image is generated in synchronization with this signal. The period of the vertical synchronous signal is the display duration of the frame images (frame period).

The sound processing unit 105 generates audio signals representing voices, music or sound effects in accordance with the sound data stored in the RAM 103, and supplies them to the speaker 22 via an unillustrated audio circuit, within the display apparatus 20.

The input-output interface 107 is connected to the input device 30 and the memory card 50 which is inserted in the card slot 14 (not illustrated), and controls the timing of data transfer between the above and the CPU 101 and other circuits. It is needless to say that the computer comprising the game apparatus relevant to the present invention is not limited to the computer shown in the figure or the like.

The CD-ROM 40 is a storage medium storing the game program 41 and the data 42 used thereby. The CD-ROM drive 106 reads the game program 41 together with the data 42, and stores them in the RAM 103 for execution by the CPU 101. It is possible that the game program 41 and the data 42 used by the game apparatus of the present invention are provided by other methods. For example, a method can be employed in which the game program 41 is transmitted as computer data signals, which are for execution of the program by the computer, and contained in a carrier wave used for communications, and the signals are received on the game apparatus side.

For example, it is possible to download a game program from another apparatus (not illustrated) connected to a network 110 via a communication line 111 through the communication interface 109, and the downloaded program is used in the game apparatus. Also, it is possible to store said game program and data in the memory of another apparatus connected to the network 110 via the communication line 111 in advance, and then store the game program and the data into the RAM 103 one by one on demand via the communication line 111 for use. Furthermore, it is possible to configure the game apparatus 10 so that only one of the methods of use described above and use of a CD-ROM is supported.

Figure 2:
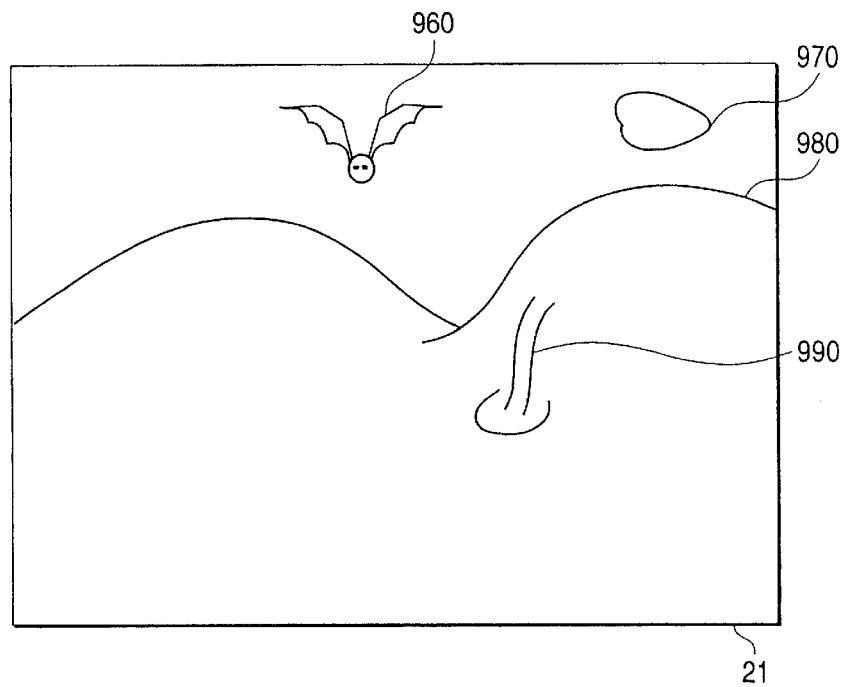
FIG. 2 is a view showing an image displayed by a game program executed by the game apparatus.
Figure 3:
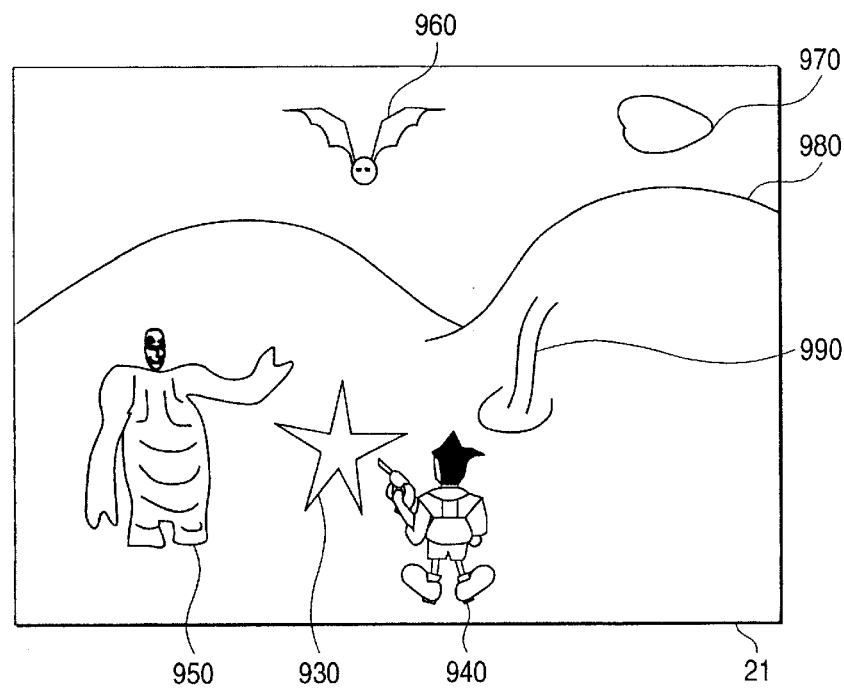
FIG. 3 is a view showing a player character, an enemy character and flash displayed to be superimposed with abovementioned image.

FIG. 2 shows schematically an example of an image used in a battle scene. On the screen 21, a bird 960, clouds 970, mountains 980 and a waterfall 990 are displayed. Such a screen is displayed when the situation of the video game is changed and a series of new images (scene) begins to be displayed. As shown in FIG. 3, the player character 940 and the enemy character 950 joining battle are also displayed, actually, being superimposed on the images. Sometimes, a plurality of the player characters and the enemy characters exist. As is clearly understood from FIG. 3, the images shown in FIG. 2 are displayed during progression of the battle.

Some of the objects displayed as images are not always static objects. In FIG. 2 for example, the mountains 980 are static, but other objects are indicated by images that change over time passes. The clouds 970 are displayed so that they appear and disappear as time elapses, or the position of appearance changes randomly as time passes, or move laterally. The clouds 970 are sometimes displayed so as to change in color with each appearance. The waterfall 990 is displayed so that changes in current are shown and its splashes changes as time passes. The bird 960 is displayed as if it is flying in the air whilst moving the wings.

FIG. 3 shows an example of object 930 called "effect". During progression of the game, for example, when the player character 940 fires the gun at the enemy character 950, in order to represent this, the object 930 is displayed for a short time as a flash. In this specification, the effect objects like this are handled as objects comprising images.

After an image as shown in FIG. 3 is displayed, when the player operates the input device 30 (FIG. 1) and instructions to battle, the position of the player character 940 is changed in response to the player's manipulation. Responding to this, the action of the enemy character 950 also changes. When a movement of the player character 940 is instructed by the player, the position of the player character 940 changes accordingly.

As described above, in the video game, many objects in addition to the player character 940 and the enemy character 950 are displayed. Thereby a variety of images are obtained. As cleared by the descriptions above, there are many kinds of objects which make up the images, and each of their emergence timing and movements are different depending on each object. The present invention provides an object displaying method suitable to generate object images which represent many objects making up images as described above. In the embodiment of the present invention, the schedules from generation to extinction and the movement patterns of many objects are defined as movement information.

Furthermore, as described above, the character like the bird 960, etc. which is displayed as images, are called characters simply, and are handled in a manner distinguished from the player character 940 which is operated by the player and the enemy character 950 which varies its movement responding to the movement of the player character 940.

As every character like the bird 960, the player character 940 and the enemy character 950 has their joints, to represent their movement, a process different from that for other objects which appear on images is required for these characters. However, in these characters, as the player character 940 and the enemy player 950 are represented using more polygons, and as they move quickly responding to the player's manipulation, it is necessary to execute more complex process at a high speed.

Because of this, as in the general case, in the embodiment of the present invention also, as described later, a part of the program for generating the image of the player character 940 and the enemy character 950 which is different from that for generating the bird 960 is used.

Figure 4:
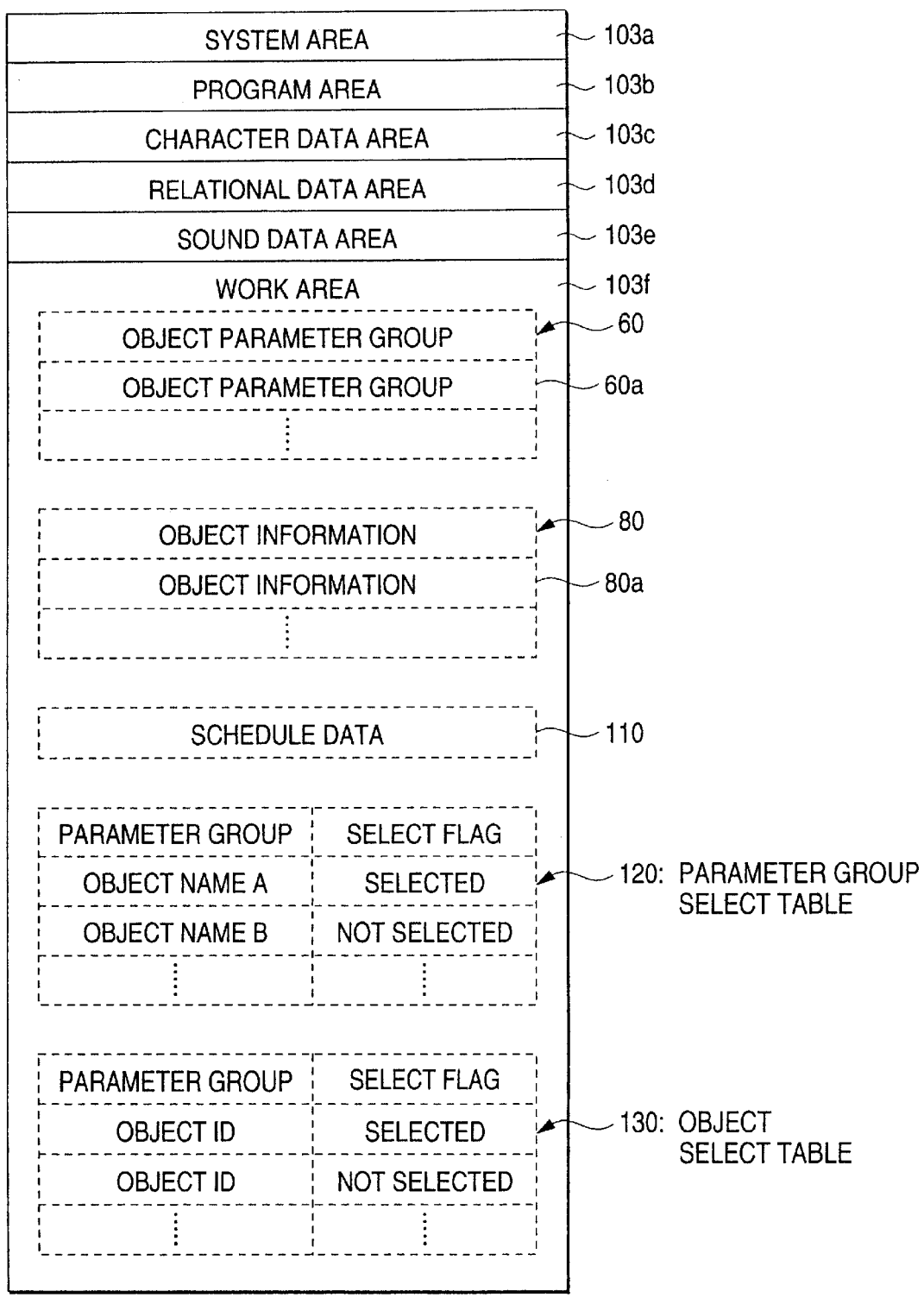
FIG. 4 is an example of memory map of a RAM within a computer included in the game apparatus.

When the game program is executed, RAM 103 is used in accordance with, for example, a memory map as shown in FIG. 4. In the system area 103a, a system information such as an interrupt vector which indicates the destination of a jump in an interruption processing routine is stored. In the program area 103b, a part of the game program which is now under execution is stored.

A part of the program which executes the main process (description will be given later) is also stored in this area. In the player character data area 103c, data on the player character 940 and the enemy character 950 which appear during progression of the game is stored.

In the relational data area 103d, other relational data which is used during execution of the game program id stored. For example, motion data for the player character 940 and the enemy character 950 is stored. However, as this relational data has no direct relationship with the present invention, description on this is omitted. In the sound data area 103e, data for generating sound during progression of the game is stored.

The work area 103f is used as a work area for storing other data temporally when the game program is executed. A work area described below which is required for object image generation process relevant to the present invention is also secured in the work area 103f.

In the work area 103f, for example a plurality of object parameter groups 60, 60a . . . , a plurality of object information 80, 80a . . . , schedule data 110, parameter group selection table 120 and object selection table 130 are stored.

The object parameter groups 60, 60a are a set of parameters for defining the movement pattern of an object within the movement information, wherein the movement pattern means the definitions of the generation timing, direction of movement after generation, and the amount of movement, etc. The object parameter groups 60, 60a are given to each object to be displayed in the scenes.

Based on these object parameter groups 60, 60a, a physical simulation of an object or an object group is carried out. Wherein the object group means a set of objects of the same type.

For example, when expressing smoke, a lot of objects which represent fine particles are displayed. In this case, a set of objects constituting smoke is the object group. When expressing a flock of birds, a set of objects of birds constituting the flock of birds are the object group. These object groups are generated based on one object parameter group, respectively. Detailed description of the object parameter groups 60, 60a will be described later (refer to FIG. 7).

The object information 80, 80a are a set of parameters corresponding with the individual object to be displayed. By referring to this object information 80, 80a, movement of respective objects, etc., can be calculated. Detailed description on the object information 80, 80a will be described later (refer to FIG. 10).

The schedule data 110 are stored in the CD-ROM 40 corresponding to scenes in the game in progress. When each scene starts, a related schedule data 110 is read out in the work area 103f of the RAM 103. In the schedule data 110 display start time and display end time of an object or an object group to be displayed in a scene are set. That is, in the schedule data 110, each schedule for a plurality of different type objects is defined from their generation to extinction.

With the progression of the game, if a display start time set in relation to an object is reached, a readout object parameter group stored in the CD-ROM 40 corresponding to the object is written into the work area 103f in the RAM 103. By being written into the work area 103f, it becomes an object to be processed in the parameter analysis process described later.

With further progression of the game, if a display end time set in relation to the object reaches, the object parameter group corresponding to the object is excluded from an object to be processed in parameter analysis process.

The parameter group selection table 120 is a table in which it is set that the object parameter group to be an object for the parameter analysis process has been selected or not during parameter analysis processing. A "parameter group" column and a "select flag" column are provided in the parameter group selection table 120.

In the "parameter group" column, an object name is given to the parameter group which is an object to be processed in the parameter analysis process. Each data in the "select flag" column are corresponded with each object name in the "parameter group" column. In the "select flag" column, a select flag which indicates that the corresponding object has been selected or not during object movement calculation processing are stored.

If "selected" is in the "select flag" column, the corresponding object is an object that has been already selected by parameter analysis processing. While, if "not selected", the corresponding object is an object that has not been selected yet by parameter analysis processing. When all objects were selected, those values are all changed into a state of "not selected", which is an initializing process for selecting the next frame period.

In the object selection table 130, the column of "object name" and "select flag" are provided. In the "object name" column, an object identification (object ID) for an object to be displayed is stored.

Each data within the "Selection flag" column correspond to each object name within the "object ID". In the "select flag" column, select flags which indicate that the corresponding object has been selected or not in the object selection processing (step S140 in FIG. 5), which will be described later. If, "selected" is in the "select flag" column, the corresponding object is an object that has been already selected, while, if a "not selected" remains, the related object is an object that has not selected yet.

The game program executed in the present embodiment comprises a initializing process for setting the initial data into the RAM 103 and a main process which controls the progression of the game and generates and displays the game display screen.

Figure 5:
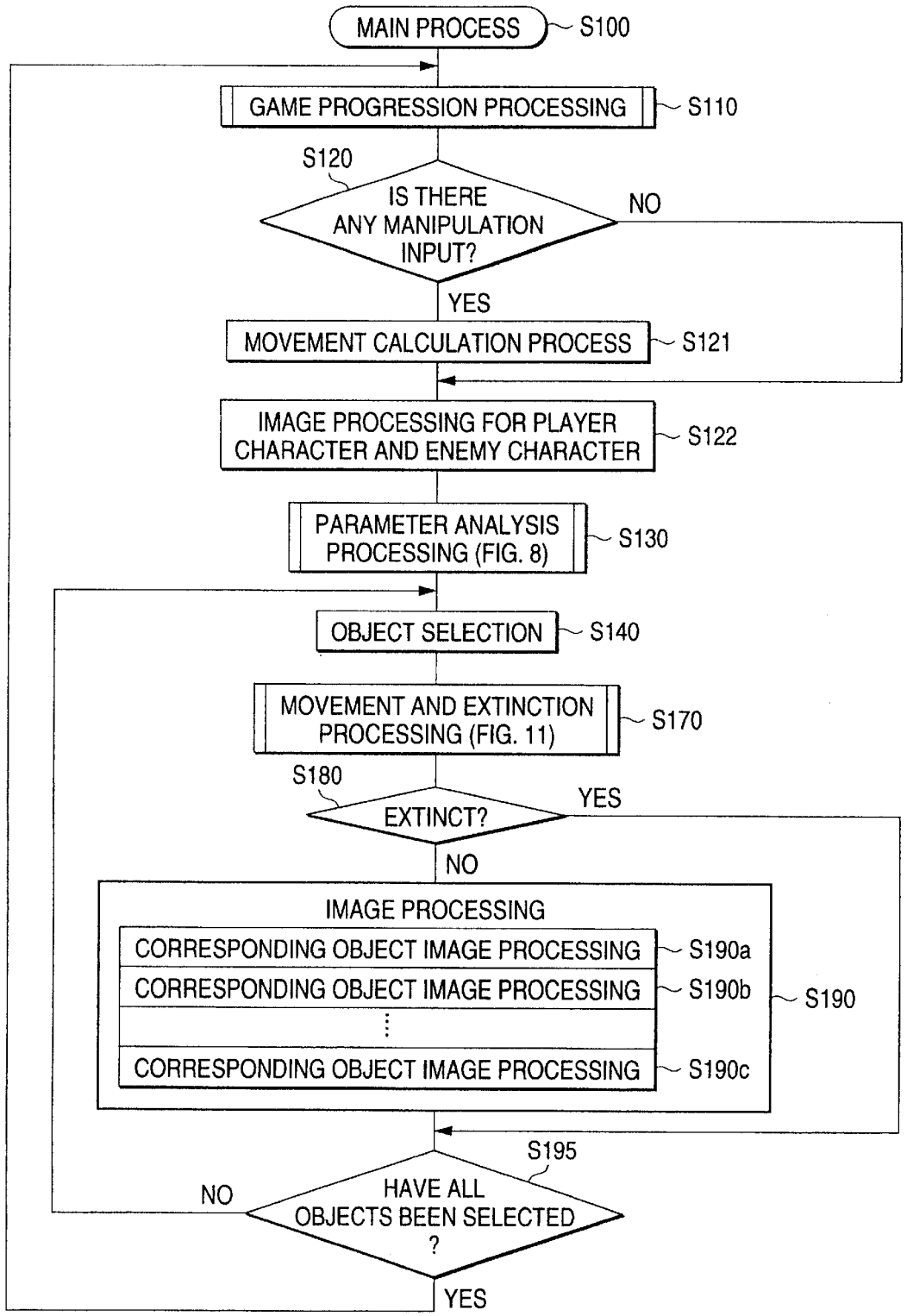
FIG. 5 is a schematic flow chart of the main process of the game program appropriate for executing with the game apparatus.

FIG. 5 shows an example of the main process S100. The game progression process S110 is started in synchronization with vertical synchronous signals. After the completion of the process, the game progression process S110 is executed again in synchronization with the vertical synchronous signals and these operations are repeated. In this game progression process S110, the progression of the game is controlled. To be concrete, a scene which expresses a partial flow of the game is changed over. For example, it is judged whether a battle scene is to start or not corresponding with operator's manipulation. After that, the progress of the game is controlled corresponding to the player's manipulation.

For example, when a battle is started by player's manipulation, in the game progression process S110, if the player character wins the battle, a point is obtained and the kind of arms the player character is allowed to use is changed. Also, it is judged whether the player character lost the battle or not against the enemy character.

If it is judged that the player character lost a battle against the enemy character, a game over process is carried out by the main process S100 and the main process S100 terminates. However, since the details of the judgement of the player's defeat has no relation to the present invention, detailed description of it is omitted. Also, in FIG. 5, terminating process of the main process S100 is omitted in order to simplify the description.

In the embodiment of the present invention, generation and extinction of an image of a plurality of objects making up the image and movement of the objects are controlled based on the values of the object parameter group for each object. An object parameter group comprises a plurality of parameters commonly specified to the plurality of the objects which move without depending on manipulation input. An object parameter group is used for each object.

When a new scene is selected, the game progression process S110 reads out a schedule data 110 corresponding to the scene from the CR-ROM 40 (FIG. 1) to appropriate area in the RAM 103, for example, the work area 103f (FIG. 4). Read out schedule 110 is referred to at every progression of the game.

Figure 6:
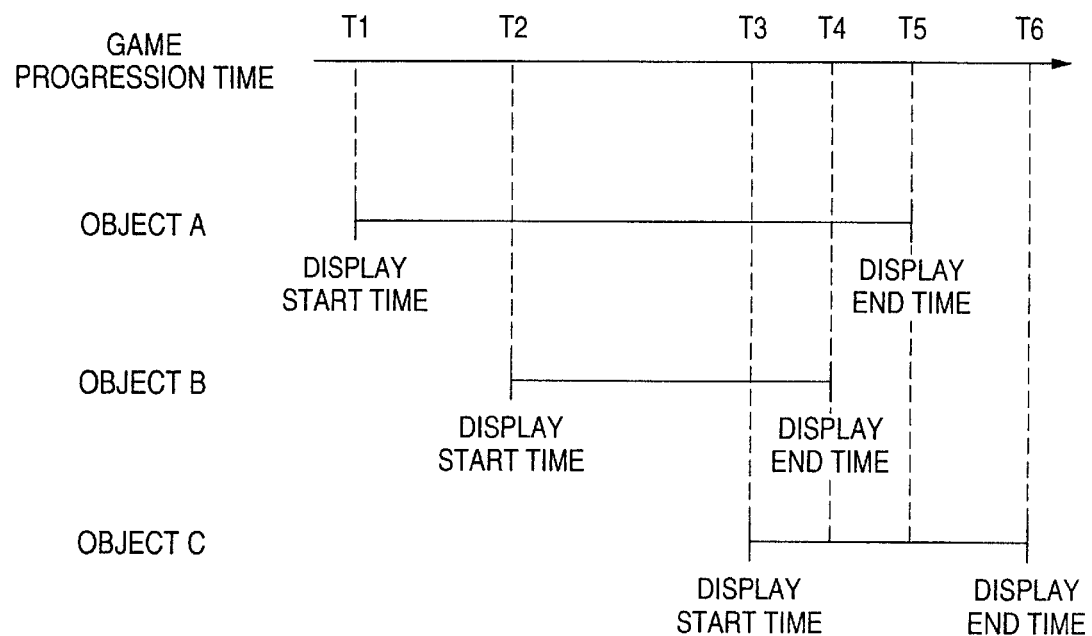
FIG. 6 is a time chart representing a display time zone of different objects.

FIG. 6 is a time chart showing object display timing in a scene. In the figure, the axis of abscissas shows game process time. Object display timing is controlled based on the schedule data which define the timing of display duration, generation and extinction of each object. This schedule data is read out from the CD-ROM and stored in the work area 103f.

In the schedule data (FIG. 4), display start time (i.e. generation time) and display end time of an object to be displayed are set. For example, "object A" is set so that display starts at a time T1 and terminates at a time T5. "Object B" is set so that display starts at a time T2 and terminates at a time T4. "Object C" is set so that display starts at a time T3 and terminates at a time T6.

In the game progression process, the abovementioned schedule data is referred to, and at every progression of a game, game progression time and the contents of the schedule data is compared. If there is an object which has reached the display start time, an object parameter group for displaying the object is set as an effective object parameter group.

Furthermore, if there is an object which has reached the display end time, the object parameter group of the object is set as an ineffective object parameter group. If an object parameter group is made ineffective, the object information of all objects which are generated based on the object parameter group is deleted from the work area 103f. As a result, these objects are extinguished.

In the data read out from the CD-ROM to the work area 73 of the RAM 103, object parameter groups corresponding to each of the abovementioned objects are included. By using the object parameter group for each of said objects, a series of frame images making up the image of a scene is generated by the main process S100, and is displayed as an introduction image of the scene and is being displayed during the progression of the game in the same scene.

The images which represent the player character 940 and the enemy character 950 are, as described later, generated by the main process S100 without using these object parameter group.

Figure 7:
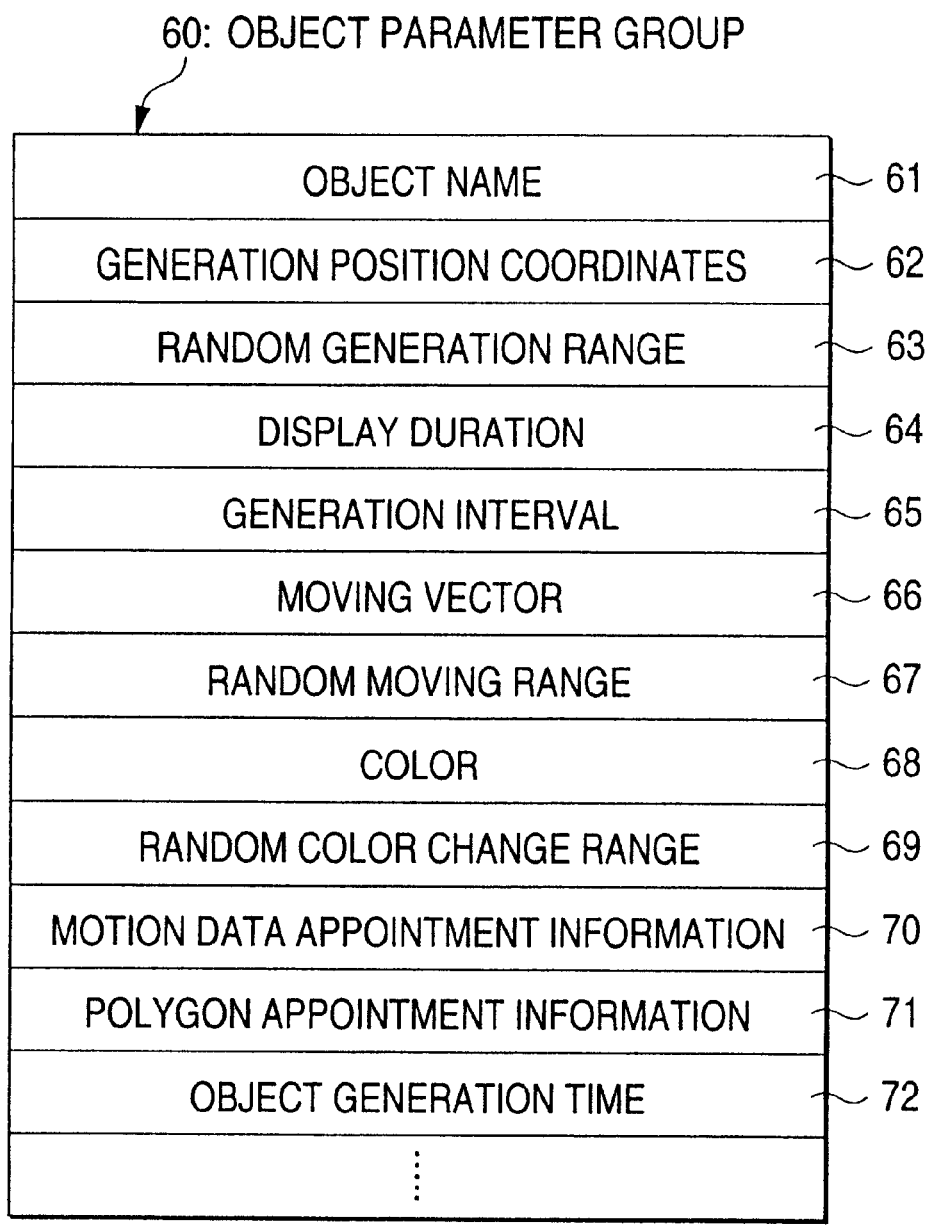
FIG. 7 is a view showing an example of contents of a parameter group appropriate to be used by the main process.

FIG. 7 shows a part of an object parameter group usable in the embodiment of the present invention. Actually, an object parameter group includes, for example, over one hundred parameters. An object parameter group includes a plurality of essential parameters which have to be appointed with values without depending on the type of the object, and a plurality of the optional parameter of which values do not have to be always appointed.

The object name 61 represents the object name corresponding with a group of the object parameters and is an essential parameter. As described later, types of the corresponding object are distinguished based on this object name 61, in accordance with the type, an image generation procedure for the object is determined. Therefore, the object name 61 is one of the parameters which designate image requirements designating the object to be generated.

The generation positional coordinates 62 indicates referential positional coordinates for generating objects in three-dimensional virtual space, and are essential parameters. The random generation area 63 indicates a range wherein the position at which objects are to be generated can be changed at random based on the generation positional coordinates 62. If the area is represented by a circle centering the generation positional coordinates 62, it's radius indicates the range. This parameter is optional and is used, for example, for smoke or clouds. The generation positional coordinates 62 and the random generation area 63 are examples of parameters which indicates positional requirements specifying displaying position of objects.

The displaying duration 64 is a parameter concerning schedules which indicate duration from generation to extinction of each object. For example, the display duration 64 designates the number of frames to be displayed after generation. For objects constantly displayed, the parameter includes a specific value, for example, "0" which represents "constant". This parameter is essential.

Generation interval 65 is a parameter wherein objects intermittently generated in plurality are generated, where the duration of the object from its generation to the subsequent generation is indicated. If the generation interval 65 is an effective value, this parameter designates that the corresponding object should be generated repeatedly at an interval designated by the parameter. This parameter is optional, and is used, for example, for clouds or smoke. The display duration 64 and generation interval 65 are an example of parameters designating time requirements which determines display time of an object.

Movement vector 66 represents an amount of movement and a direction of movement from a position in a three-dimensional virtual space of the object where normally a frame image displayed immediately before is generated to a position in a three-dimensional virtual space of the object where a next frame image to be displayed is generated. This parameter is essential. For static objects such as mountains 980, this parameter has a specific value which indicates standstill. When the movement vector 66 is an effective value other that this specific value, this parameter indicates that the corresponding object is made to moved.

Normally, as a moving object appearing as an image such as a bird 960 or cloud 970 (FIG. 3) moves linearly, this movement vector 66 can be constant without depending on time. However, there is a case when it is desirable to display an object moving irregularly like the bird 960. In such a case, it is possible to specify the movement vector 66 to change as time passes based on the random movement range 67.

The random movement range 67 indicates a range where in a value of the movement vector 66 of a generated object can be changed at random. For example, if the range is represented by an angle, the direction of the movement vector 66 is changeable within the range of angle. This parameter is optional, and is used for, for example, smoke or clouds. The movement vector 66 and the random movement range 67 are the parameters which designate movement among the positional requirements of object.

Colors for objects are being individually designated to each object, in the process of making an image representing an object, each surface of the polygons making up the object is given a color by texture mapping processing. Color parameter 68 indicates colors to be added to those of the object. This parameter is optional and is used for, for example, smoke or clouds.

The random color change range 69 indicates the color range of an object to be changed from a color designated by the color parameter 68. This parameter is optional and is used for, for example, smoke or clouds. The color parameter 68 and the random color change range 69 are the parameters which represent image requirements of an object.

The object parameter group includes a plurality of parameters which designates an image of an object to be generated. For example, the motion data appointment information 70 is information which designates motion data used for creating an image character such as a bird 960 (FIG. 3); for example, an identifier of a motion data. The polygon appointment information 71 designates polygons appropriate to represent a corresponding object. These parameters are handled as image requirements of the object.

Basically, every object making up an image consists of a plurality of polygons. The polygon appointment data 71 which is used to generate an image of an object is also included in the parameter group corresponding to the object and is handled as an image requirement for the object.

The object generation time 72 in a parameter group stores a generation time when a generation process of an object is carried out based on the object parameter group. For the next repeatedly generated object, it becomes possible to properly control the generation timing of the same object.

The object parameter group includes the many parameters which further designate other information. However, descriptions for those parameters are omitted to simplify the description.

Returning to FIG. 5, in the main process S100, using a object parameter group for each of a plurality of objects included in an image determined by the game progression process S110, these objects are generated, and the image is generated and displayed. On the other hand, the images representing movement of the player character 940 and the enemy character 950 are generated in response to player's manipulation.

To be concrete, it is first distinguished whether there is any input made by the player or not (Step 120). During changing of a scene, manipulation input is not received at once. If there is no manipulation input, depiction processing S122 for the player character 940 and the enemy character 950 is executed. In this process, an image representing these characters are written in a frame butter (not shown).

As described above, when a scene is changed, the object parameter groups for all objects are renewed. In this case, the parameter analysis process S130 is carried out on every renewed object parameter group. In the parameter analysis process S130, a plurality of the renewed object parameter groups are analyzed in order. Furthermore, physical simulation is carried out on every object by the steps S130, S140, S170, S180 and S195 described below.

Figure 8:
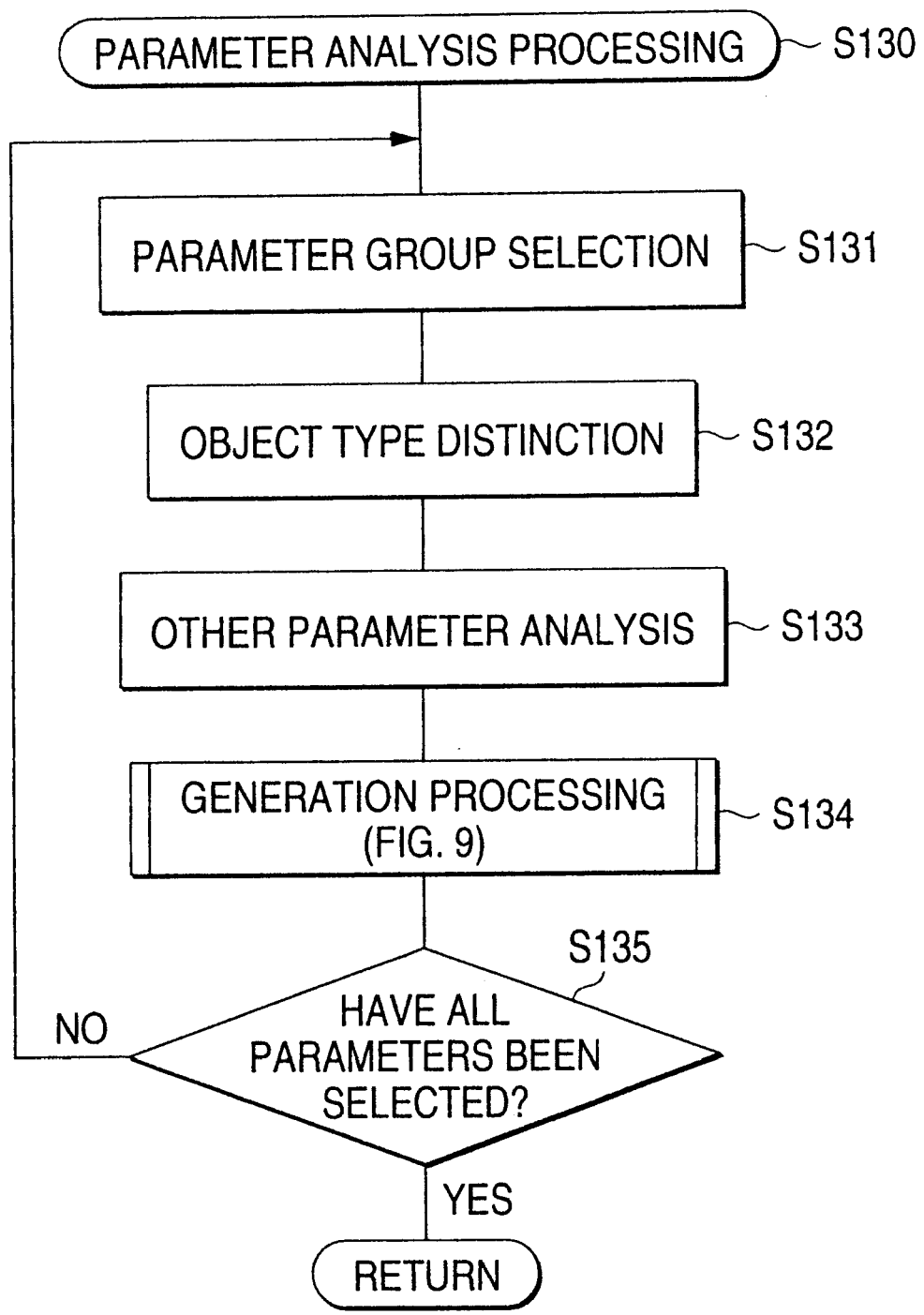
FIG. 8 is a schematic flow chart of an object parameter analysis process appropriate to be executed by the main process.

FIG. 8 shows the flow chart indicating the parameter analysis procedures. In the parameter analysis process S130, by referring to the parameter group selection table 120 (FIG. 4), one of the object parameter group is selected out of a plurality of object parameter groups which are renewed in the game progression process S110 (Step S131). Based on an selected object name 61 in the object parameter group, type of the corresponding object are distinguished (Step S132).

For example, it is distinguished whether the object is a bird 960, clouds 970, a waterfall 990 (FIG. 2) or an object called an effect which emits specifically a flash of light in a certain range as the flash 930 (FIG. 3).

After that, other parameters are analyzed in order (Step S133). For example, the values of the essential parameters are analyzed in order. Then, the values of the optional parameters are analyzed in order.

After analyzing the selected object parameter group, the generation process based on the selected object parameter group is carried out (Step S134).

Figure 9:
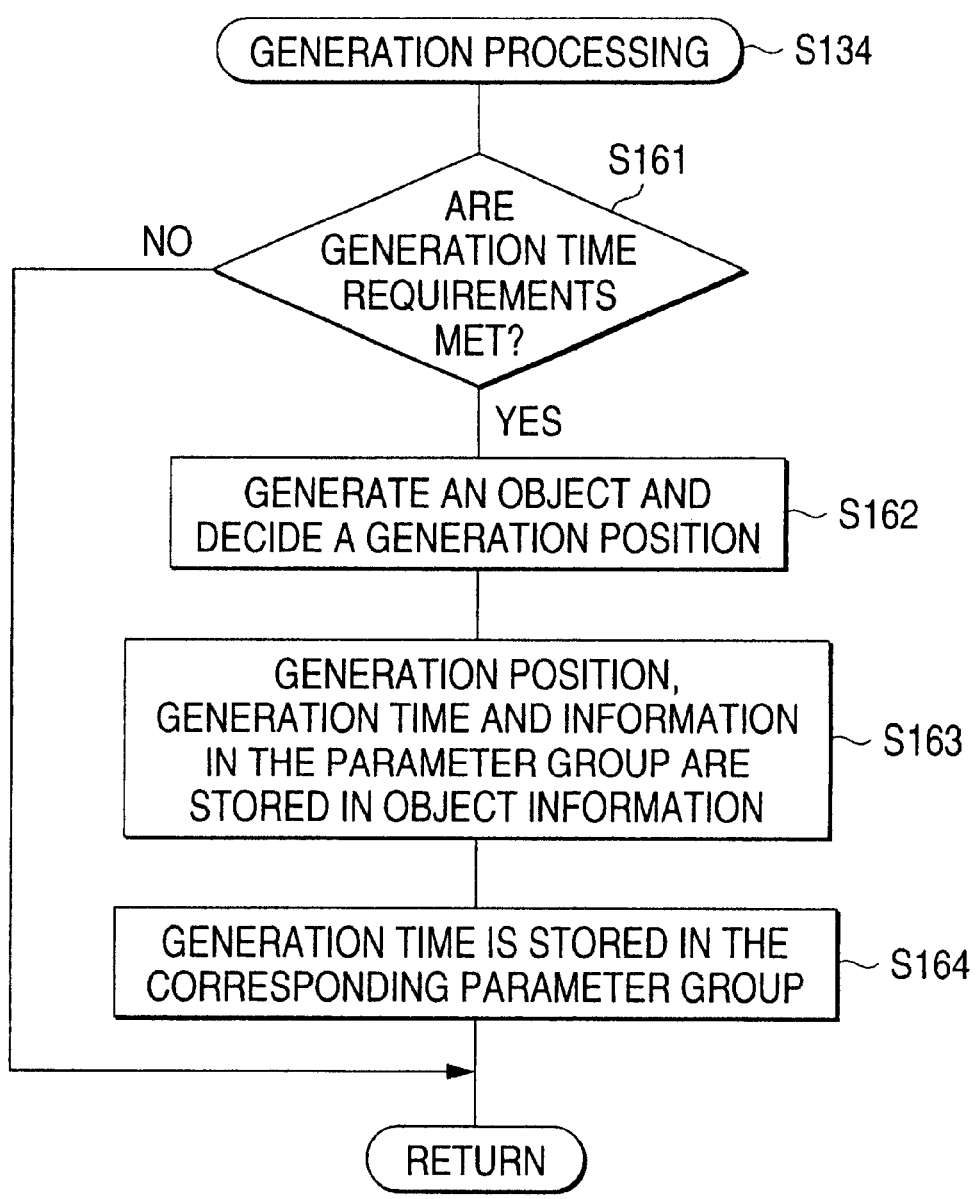
FIG. 9 is a schematic flow chart of an object generation process appropriate to be executed by the main process.

Hereinafter, the object generation process is described in detail. FIG. 9 is a flow chart indicating outline of the object generation process. In the figure, based on the object parameter group selected in step S131, it is decided whether the time requirements concerning generation of the corresponding object is met or not (Step S161).

If an object has been generated previously based on a parameter group, it is processed so that the generated time is stored in the object generation time 72 (FIG. 7) in the parameter group at the time when the object is generated. There is a case wherein the same object as the object which has been generated once is generated repeatedly at predetermined intervals. The generation interval 65 in a parameter group designates an interval with which the identical object is generated repeatedly. Therefore, based on these two parameters in the parameter group, it is judged whether a new object should be generated or not based on the parameter group.

To be concrete, it is judged whether a time designated in accordance with the generation interval 65 has elapsed or not from the object generation time 72 in the selected object parameter group. If the time designated in accordance with the generation interval 65 has elapsed from the object generation time 72, it is judged that the time requirements for the object generation are met in Step S161. And since immediately after changing the scene, the object generation process is not carried out, no data is registered in the object generation time 72. In case where no data is registered in the object generation time 72, it is judged that the time requirements for the object generation are met regardless of the time designated in accordance with the generation interval 65 in Step S161.

Also, if the time designated in the generation interval 65 has not yet elapsed from the generated time of the object previously generated based on the selected parameter group, it is judged that the time requirements for generation are not met.

If the time requirements for generation are met, the object is generated. To generate an object, a displaying position of the object in a three-dimension virtual space is determined based on the position requirements of the object (Step S162).

The parameter which indicates the positional requirements of the object consists of the generation positional coordinates 62 and the random generation range 63. If the random generation range 63 is not effective, the generation position coordinate 62 is used as a generation position of the object as it is. If the random generation range 63 is effective, one coordinate system included in a range designated by the parameter is generated at random, the generated coordinate is used as a generation position of the object.

Thereafter, in accordance with the object being processed to be generated, the kind of the generated object and the identifier (ID) assigned to the object are stored. Further, various data including the generation position and the time of generation of said object which are determined in step S162, and the group of object parameters selected when generating the object is stored as information for the generated object.

Figure 10:
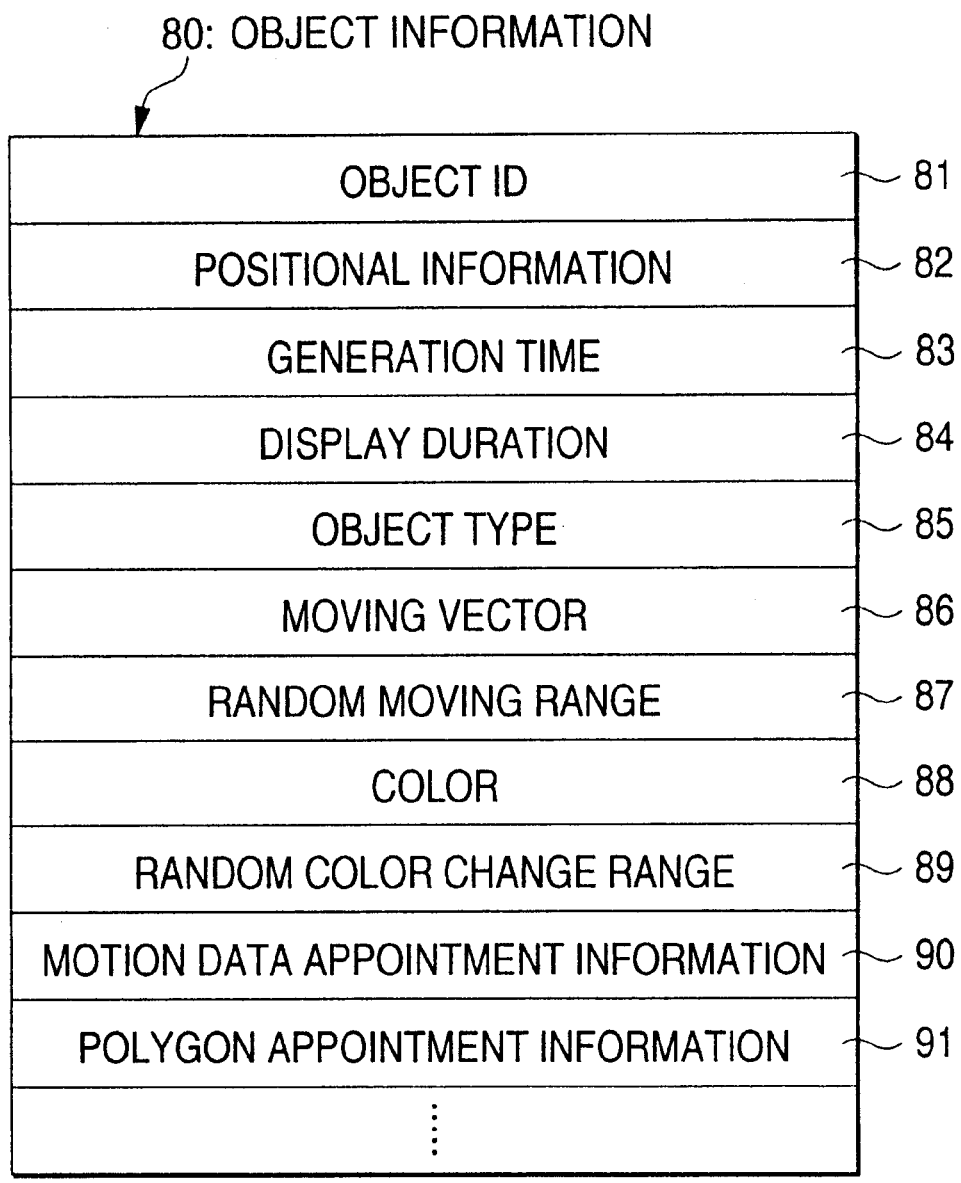
FIG. 10 is a view showing an example of object information generated each object.

FIG. 10 shows an example of the object information. The object information is stored with the object ID (81), positional information 82, generation time 83, display duration 84, object type 85, movement vector 86, random movement range 87, color 88, random color change range 80, motion data designation information 90 and polygon designation information 91 etc.

The object ID (81) is an identifier given to a generated object, and even if generations are made based on the same object parameter group, individual ID's are given. The positional information 82 is a coordinate value which indicates a display position of an object at every frame period.

This positional information 82 is updated at every frame period by the move and extinction process (Step 170) described later.

The generation time 83 means a time when an object is generated. The display duration 84 is a parameter which indicates how long from the generation time it should be displayed. For this parameter, the value of the display duration 64 of the object parameter group which is a source of generation of the object is set as it is.

The object type 85 is stored with the type of the object which is distinguished in the object type distinction process (Step 132). For example, information such as a character accompanied with motion or a simple model consisting of one polygon is stored.

The movement vector 66, random movement range 67, color 68, random color change range 69, information 70 for specifying motion data, and information 71 for specifying a polygon which are included in the group of object parameters being the source of generation of the object are set as the movement vector 86, random movement range 87, color 88, random color change range 89, information 91 for specifying motion data, and information 91 for specifying a polygon.

Meanings of the these parameters are as described in the descriptions for the object parameter group in FIG. 7. As these parameters are set corresponding to an object, a process designated by the parameters are applied to the object.

Returning to FIG. 9, the current generation time is stored in the object generation time 72 in an object parameter group which is now in process (Step S164).

When storing process of generation position, etc is completed or if it is judged that the generation time requirements are not met by the judgement process (Step S161) of the generation time requirements, the generation process completes and returns to the parameter analysis process (Step S130) (FIG. 8).

Returning to FIG. 8. When the generation process is completed, referring to the parameter selection table 120, it is judged whether all of the object parameter groups have been selected (Step S135). If any parameter group which has not been selected remains, it goes to the step S131 and a parameter group is newly selected. If all of the parameter groups have been selected in the step S131, the parameter analysis process is terminated and returns to the main process S100.

Returning to FIG. 5. Referring to the object selection table 130 (FIG. 4), an object which has not been selected yet is selected from the generated objects (Step S140). The move and extinction process is carried out on the selected object (Step S170).

Figure 11:
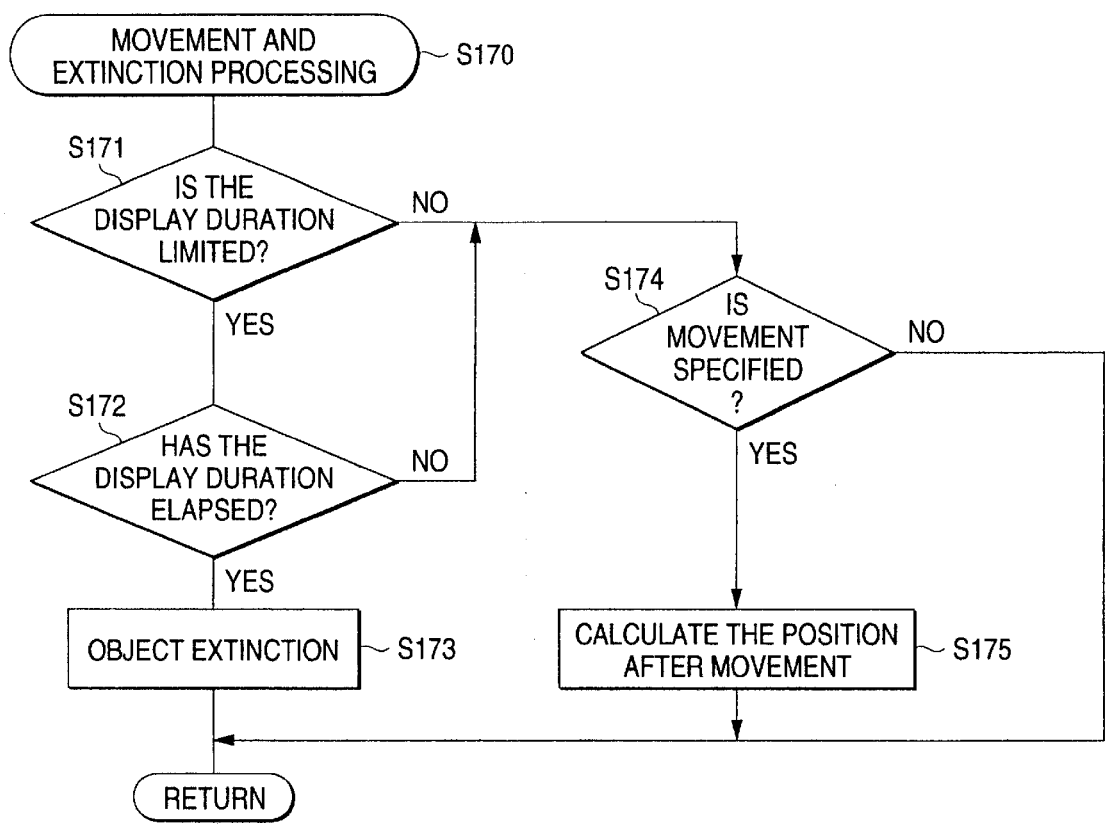
FIG. 11 is a schematic flow chart of a move and extinction process appropriate to be executed by the main process.

As shown in FIG. 11, in this process, it is judged whether the display duration for the selected object is limited or not based on whether the display duration 84 which indicates the time requirements within the object information with respect to the object designates a limited duration or not (Step S171). If this display duration 84 indicates a limited display duration, it is judged whether the display duration of the object has already exceeded the duration designated by the display duration 84 (Step S172).

If the display duration of the object has exceeded a designated duration, the object is extinguished (Step S173). That is, object information stored in the RAM 103 corresponding to the object is cleared.

In the judgement step S171 described above, if the display duration for the object is not limited, or in the judgement step S172, if it is judged that the display duration of the object has not exceeded the designated duration yet, it is judged whether the movement is instructed to the object under processing or not (Step S174). That is, it is judged whether the movement vector 86 for the object has a value indicating movement of the object or not.

If the movement vector 86 of the object designates a movement of the object, or a position of the object after movement; that is, a position where the object should be positioned in the three-dimension space at the next frame period, is calculated and stored in place of a positional information 82 which was previously stored (Step S175).

To be concrete, a new position is calculated based on the positional information 82 which indicates current position of the object and the movement vector 86 which is one of the positional requirements within the object information for the object. The current position is the position of the related object where is determined at generation of a frame image immediately before. If the random movement range 87, which is another positional requirements within the object information for the object, has an effective value, the movement vector 86 is changed at random with the value and the changed movement vector is used for calculation of the new position.

Returning to FIG. 5. It is judged whether an object under processing is extinguished or not. If the object is not extinguished, the depiction process S190 is executed by using a depiction program which is set corresponding to the object, and an image for displaying the object at a new position after moving is stored in a frame buffer. After that, the process returns to step S195.

In the judgement of the step S180, if it is judged that an object under processing is the object which has been extinguished, the depiction process S190 is skipped and the process goes to the object judgement step S195.

In the depiction process S190, respective positions in the three-dimensional space for a plurality of polygons, which constitute the object based on the display position determined by the generation process S134 for the object under processing, and accordingly, the object model for the object is determined. Further, image data for displaying the object model on the display screen are generated and stored in the frame buffer provided in graphic processing unit 104 (not illustrated) in order.

That is, rendering processing such as perspective conversion etc., is carried out on a plurality of polygons constituting the object model of each object, configuration and position on the display screen of a plurality of polygons constituting said object model are determined so as to represent an object model displayed in the screen of the display apparatus 20. Also, texture mapping processing is carried out on the object model, and a color and a pattern, etc., are assigned to each surface of a plurality of polygons, constituting the object model.

In the texture mapping processing, if the value of the color parameter 88 is significant in the object information with respect to the object, a color designated by this parameter is added to a color of all polygons constituting the object model. Further, if the value of the random color change range 89 is also significant, a color to be added at random within the color range specified by the random color change range 89 with a color specified by the color parameter 88 is determined. The color designated on is added to the color which is designated to the object model and resultant color is used as a color of the object model.

Thus, a graphic data is generated for the polygons constituting the object model. It is ordinary that the processing to be carried out in the depiction process differs depending on the objects. In a depiction process the positions of polygons is determined in the three-dimensional space and in a process to determine an object model, if the object is a character such as a bird 960, it is necessary to determine the positions of the polygons in the three-dimensional space, which reflect the movements of joints of the arms and legs. On the other hand, the other objects does not require such complex processing. Therefore, for depiction character objects, it is convenient to use an depiction program which enables execution of this special processing.

Also, a special texture mapping process is carried out for smoke and waterfall etc., which is different from the others. Therefore, it is desirable to use an depiction program for these respective objects.

From this point of view, in the present embodiment, in order to execute the depiction process S190, a plurality of corresponding object depiction processing S190a, S190b, S190c can be executed. These processes are executed by different parts of the program respectively.

These programs are provided corresponding to each type of object, respectively. The depiction processes S190a, S190b, S190c are the depiction processes for depicting, for example, a character, smoke and waterfall respectively.

When the above described processes are completed in relation to the object under processing, object selection table 130 is refereed to, and it is judged whether all objects have been selected or not (Step S195), if the object remains unselected yet, processes from step S140 are repeated.

Thus, as a image for new scene, generation and depiction processes of abovementioned objects with respect to a plurality of objects to be displayed first, are executed in order, and an image representing these objects is included in the same frame image together with the an image representing the player character generated at the preceding step S122 and the enemy character.

After the processing of all objects is completed, and when the next vertical synchronous signal is newly generated, the generated flame image is newly displayed on the display device 20. Further, processes from the game progression process are repeated again, and the succeeding frame image is generated.

When the game progression process S110 is repeated again, in this process, as described above, it is judged whether the scene should be changed or not based on player's manipulation input. However, in this case, as it is assumed that the scene has just started, it is assumed that there is no manipulation by the player. Therefore, in this case, the game progression process S110 does not specially execute anything in relation to the present embodiment.

In the judgement step S120 also, judgement of manipulation input is carried out. Since it is now assumed that there is no manipulation input, the depiction process S122 is carried out for the player character and the enemy character in the same way as described above. In a condition when there is no player's manipulation, since these characters are normally at a standstill, in this depiction process S122, the same image as the image representing these characters previously depicted is written in the frame buffer.

After that, the process progresses to the step 140.

As described above, after a process of the object under processing is completed, it is judged by the step S195 whether any unselected object remains or not. If any object remains unselected, processes from the object select step S140 are repeated on the remaining objects in the same way as described above. Thus, the next frame image which includes all objects included in the next frame image are generated. The process is repeated like this and the succeeding frame image is generated.

There is a case wherein a manipulation input is given by the player while the main process S100 is repeated. In such a case, since the carrying out of manipulation input is judged by the judgement step S120, the movement calculation processing S121 is executed, and herein responding to the player's manipulation, the player character is calculated and accompanying this, a new position of the enemy character to be changed is also calculated. Based on new positions of each character the depiction processing S122 for each character is executed, and an image representing said two characters positioned at new respective positions is stored in the frame buffer (not illustrated).

If the game progresses further, there is the case when a player's manipulation which instructs the gun to fire at the enemy character is given by the player. After this manipulation input, when the main process S100 is executed, in the game progression process S110, this manipulation input is detected, and in order to display the flash 930 (FIG. 3) representing discharge of the gun, the object parameter group corresponding to this object is generated.

After the parameter analysis process S130 is executed, the flash object corresponding to the object parameter group is added to the object of the process from the step S140, and an image of flash object is generated in accordance with the generation condition designated by the object parameter group.

A frame buffer provided in the graphic processing unit 104 (FIG. 1) consisting of a pair of frame buffers A and B (not illustrated), and the image data of a plurality of objects constituting a frame image which is generated by the depiction process S190 is stored into either one of said pair of frame buffers.

After the generation of a frame image is completed, after that, a generation of a vertical synchronous signal is awaited by the display device 20 (FIG. 1). Synchronizing with the generation of the vertical synchronous signal, the frame buffer changes over from abovementioned frame buffer to the other frame buffer. That is, one of abovementioned pair of frame buffers is selected as a frame buffer to store the next frame image.

The graphic processing unit 104 sends a frame image which is newly stored in one of abovementioned frame buffers, synchronizing with the generation of vertical synchronous signal after completing generation of abovementioned frame image which is sent to the display device 20, and makes it displayed on the display screen.

After that, the main process S100 is executed again from the game progression process S110, succeeding flame image are generated in order as the same described above. In the same manner as described above, an image data representing the next relevant frame image is stored into the other one of abovementioned pair of frame buffers. The above described process is executed on a series of succeeding frame images in order and a series of image data representing those frame images are stored into a pair of the frame buffers alternatively.

In parallel with generation of a new frame image as described above, the latest stored frame image is read out from the frame buffer other than the frame buffer in which a frame image under generation is stored and displayed by the display device 20.

Figure 12A:
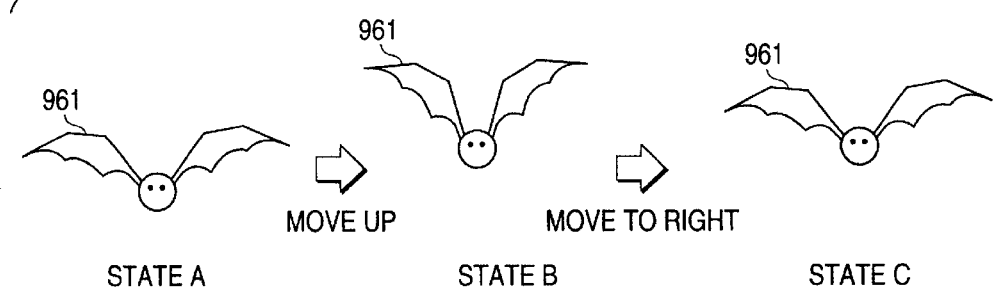
FIG. 12A is the first view showing an example of an object to be displayed
Figure 12B:
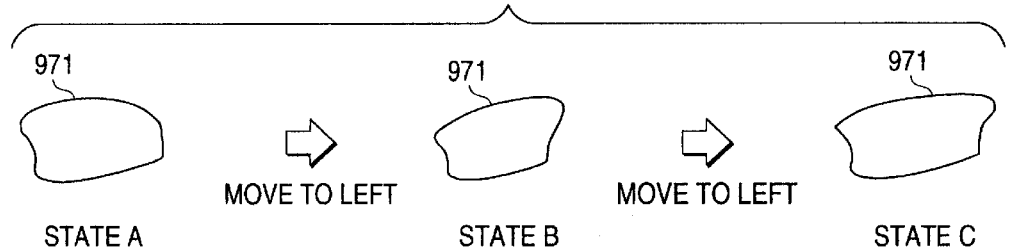
FIG. 12B is the second view showing an example of a display object.
Figure 12C:
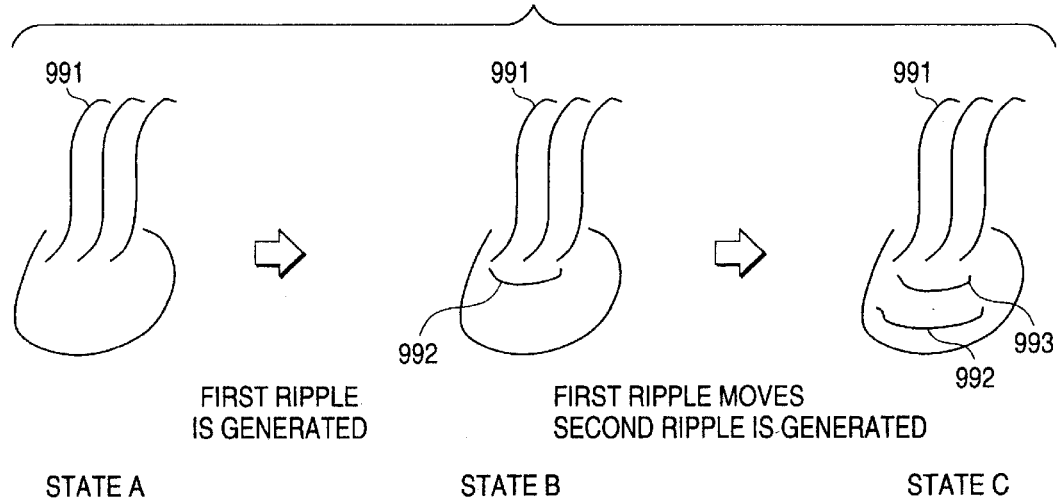
FIG. 12C is the third view showing an example of a display object.

Hereinafter, change of the display screen displayed by the present embodiment will be described. FIG. 12A, FIG. 12B and FIG. 12C show examples of an object which is an object to be displayed. In FIG. 12A, FIG. 12B and FIG. 12C show a part of a movement pattern of the bird 961, clouds 971, and waterfall 991, respectively as objects to be displayed. Also, objects 992 and 993 which are superimposed over the waterfall 991 to express ripples are generated as objects to be displayed. Hereinafter, the bird 961, clouds 971 and waterfall 991 will be described corresponding to objects A, B and C, respectively, in FIG. 6.

For the bird 961, the random moving vector 66 is set to an effective value. As a result, it is made to move upward by the movement and extinction process S170 from the time of generation in the next frame (from state A to state B in FIG. 12A). Further by the movement and extinction process S170 in the next frame, it is made to move rightward (from state B to state C in FIG. 12A). Movement pattern of the bird 961 (a part) is displayed during the display duration indicated by object A in FIG. 6.

For the clouds 971, the random moving direction 66 is set to an ineffective value. As a result, it is made to move leftward by the move and extinction process S170 from the time of generation in the next frame (from state A to state B in FIG. 12B). Further up to the next frame also in the same way, it is made to move leftward (from state B to state C in FIG. 12B). Movement pattern of the clouds 971 (a part) is displayed during the display duration indicated by object B in FIG. 6.

For the waterfall 991, a state of a constant flow of water is displayed viewed from the generation point. In the frame next to the frame wherein the waterfall 991 is generated, on the pond whereto water of the waterfall 991 falls, an object which represents a ripple 992 is generated (from state A to state B in FIG. 12C). Further, in the next frame, the ripple 992 spreads, at the same time, an object which represents a new ripple 993 is generated (from state B to state C in FIG. 12C). The movement pattern of this waterfall 991 (a part) is displayed during the display duration indicated by object C in FIG. 6.

Figure 13A:
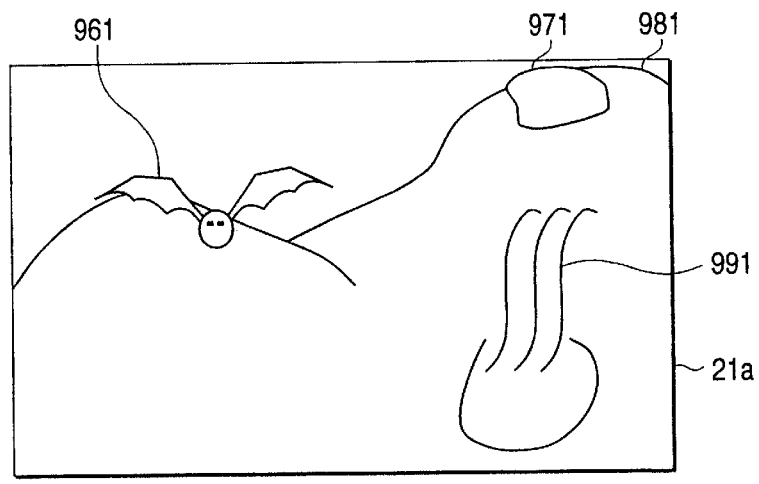
FIG. 13A is the first view showing a transition of the display screen to be displayed.
Figure 13B:
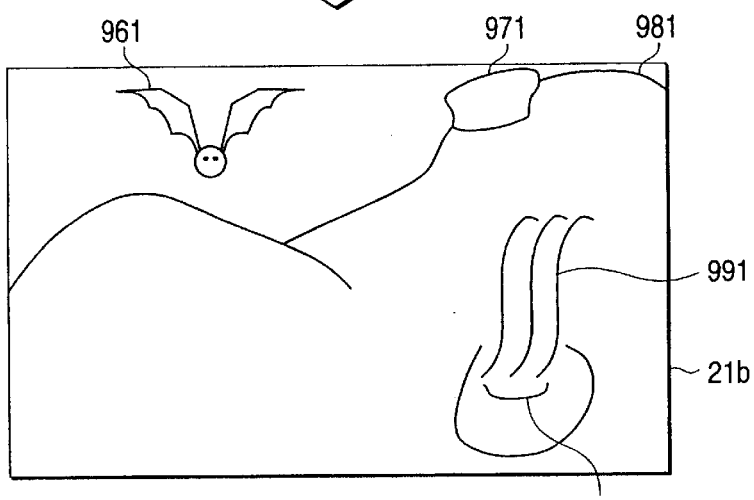
FIG. 13B is the second view showing a transition of the display screen to be displayed.
Figure 13C:
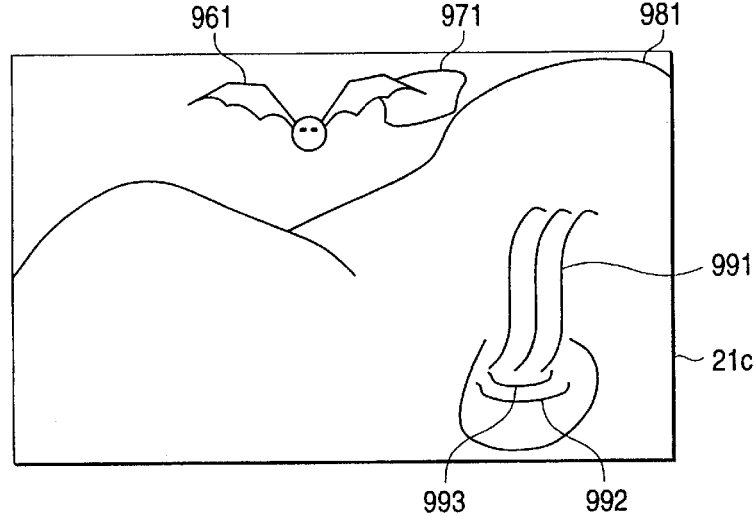
FIG. 13C is the third view showing a transition of the display screen to be displayed.

FIG. 13A, FIG. 13B and FIG. 13C shows a transition of the display screen during time T3–T4 shown in FIG. 6. This period shows that all objects of A, B and C are moving. In the first frame 21a displayed on the display 21 (shown in FIG. 13A), the images of the respective objects of the bird 961, the clouds 971, the mountains 981 and the waterfall 991 are displayed. In the second frame 21b (shown in FIG. 13B), the bird 961 moves upward and the clouds 971 move leftward. At the position of the waterfall 991, the ripple 991 is displayed by being superimposed.

In the third frame 21c (shown in FIG. 13C), the bird 961 moves rightward and the clouds 971 moves leftward. Further, at the position of the waterfall 991, the ripple 992 moves downward while spreading, and a new ripple 993 is displayed by being superimposed.

The first frame 21A, the second frame 21b and the third frame 21c show the movement patterns of three respective objects shown FIG. 12A, FIG. 12B or FIG. 12C.

As obviously described above, in the present embodiment, a plurality of objects which constitute an image and are used in the same scene, are designated with the time requirements, positional requirements and image requirements concerning generation of these respective objects by a plurality of common parameters, in order in accordance with the values of those parameters, generation, movement and extinction of the different objects is executed by the common part of the program.

As described as a prior art, if part of the object image generation program for generating each object corresponding to the different objects carries out generation, movement and extinction processes to be executed respectively, those processes have many common processes. Therefore, the size of the parts of abovementioned common program in the present embodiment becomes much smaller than the total size of the portions which carry out the same processes in the individual object image generation program.

If the processing programs for generation, etc., are prepared for respective objects, as the number of objects increase, the number of parts of the object image generation program corresponding to a plurality of objects increase, and the total size of those program increases. However, in the present embodiment, the size of said parts of the common program, even in such a case, does not increase. Therefore, a large number of objects results in a smaller size of said parts of the common program than the size required by the prior arts.

As described above, the size of part of the common program for a plurality of objects used in the present embodiment is small and the RAM capacity occupied by part of the program is small. As a result, it becomes possible to store more data in the RAM. Particularly, if it is desired to give a complex structure to each object and make them move in a complicated way, the amount of data which designates these structures and movements increase. However, by using the common program, the RAM capacity required for executing the program is decreased, and it becomes possible to ensure an area in the RAM for storing large amount of data as described above.

Further, in order to execute the processes with each of the object image generation program corresponding to each object, it is necessary to individually ensure the work area on the RAM 103. However, in the present embodiment by using a common work area for all objects, it is possible to control the generation, movement and extinction of the objects.

Therefore, it is expected that the size of the required work area can be made smaller than that of the prior arts.

Also, in the present embodiment, as it is possible to specify time requirements and positional requirements for generation to every object by using the parameter group common to a plurality of objects, it becomes possible to generate or move any object with desired generation conditions, regeneration conditions and movement mode. As a result, it becomes possible to display more varied images and increase the fun of the video game.

By the way, the present invention is not limited to the embodiment described above, and it is needless to mention that modes of the embodiment may be modified or changed within a range not deviating from the spirit of the present invention.

For example, in the present embodiment described above, in relation to all objects, the common part of a the program is used for generation, movement and extinction of the objects. However, it is possible to use a part of program common to many objects depending on the case, and to use another exclusive part of program for one or a part of the objects.

In the present embodiment described above, the depiction process S190 is executed by selecting one of a plurality of depiction programs corresponding to different respective objects and a part of those depiction programs may be commonly used for a plurality of objects.

While in the present embodiment described above, various processes are realized by executing a computer-readable program in the game apparatus, at least a part of the processes can be realized by a logic circuit. The logic circuit can be provided within, for example, the CPU 101 or the graphic processing unit 104.

In the present embodiment described above, the input device and the displaying device are provided separately from the game apparatus. However, either one or both input device and the display device may be structured integrally with the game apparatus. Further, the recording medium used in the game apparatus may not be attached or removed freely but may be installed fixed in the game apparatus.

The recording medium used with the recording medium relating to the present invention or the game apparatus relating to the present invention is not limited to CD-ROM but a computer-readable recording medium, for example, a DVD, a magnetic recording medium, a semiconductor memory or an optical recording medium may be allowable.

In the present embodiment described above, a home game apparatus is used as a platform. It is also possible that the game apparatus relating to the present invention is realized by using a general use computer such as personal computer or an arcade game apparatus as a platform. Further, it is possible that a communication terminals such as a portable telephone, a personal digital assistants, etc., are allowable for a platform.

What is claimed is:

1. An object displaying method for displaying a plurality of objects in a virtual space at a predetermined cycle on a display screen, the object displaying method comprising:

judging display timing of each object in accordance with progression of a game by referring to parameters comprising movement information in which schedules from generation to extinction of a plurality of objects of different types, and movement patterns of the plurality of objects of different types are defined, the parameters being common to all of the different types of objects, simulating movement of each of said objects in accordance with the schedule and the movement pattern defined by said movement information for the object which is judged as being at the display timing, and displaying images of objects in accordance with said simulated movement.

2. The object displaying method according to claim 1, in which the movement pattern further comprises generation position, direction of movement and amount of movement of an object, and in which said simulating further comprises, at each predetermined cycle:

generating the object at the generation position defined by said acquired movement information; and moving the position of the object, when a movement occurs, in the direction of movement defined by the acquired movement information and by the amount of movement defined by the acquired movement information.

3. A computer-readable recording medium, comprising a program for displaying a plurality of objects of different types in virtual space at a predetermined cycle on a display screen, wherein said program drives a computer:

to judge the display timing of each object in accordance with progression of a game by referring to parameters comprising movement information in which a schedule from generation to extinction of a plurality of objects of different types and a movement pattern of the plurality of objects of different types are defined, the parameters being common to all of the different types of objects;

to simulate movement of each object in accordance with a schedule and a movement pattern defined in movement information of said object judged as being at the display timing;

and to display an image of each object according to said simulated movement.

4. The recording medium according to claim 3, wherein the movement pattern further comprises a generation position, direction of movement and amount of movement of an object;

in which the simulating further comprises, at every predetermined cycle:

generating said object at the generation position defined in said acquired movement information;

calculating the position, if movement is made, in a direction of movement defined in said movement information, by the amount of movement defined in the movement information.

5. A computer-readable recording medium, comprising a program stored for executing a video game by a computer, wherein parameters are commonly specified to a group of objects positioned in a virtual three-dimensional space, which appear in a series of frame images displayed for said video game on the computer, and are commonly used for generating the group of said objects or used for generating a part of an image of the group of said objects, wherein said program drives the computer:

to analyze time requirements, positional requirements and image requirements concerning display time, display position and image for at least a relevant object based on values of a plurality of parameters which specify information of a plurality of types, specific to each object;

when generating each frame image, to judge whether the relevant object should be displayed with said frame image to be generated based on said analyzed time requirements for each object, if it is judged that said object is to be displayed, a display position of the relevant object is judged based on said analyzed positional requirements of the relevant object, and if it is judged that said object is to be displayed, to generate an image representing the relevant object positioned at the display position for the relevant object in accordance with image requirements of the relevant object analyzed by said analysis step.

6. The recording medium according to claim 5, wherein, in said judgement of display position of the object in said group of objects which has not yet been displayed by a frame image generated immediately before, said frame image to be displayed is generated, the relevant object is decided whether to be newly displayed based on the time requirements of the analyzed relevant object;

if said object is decided to be newly displayed, a displaying position of the relevant object is judged based on the positional requirements of the analyzed relevant object;

in said group of objects, the object, which has already been displayed by said frame image generated immediately before, is judged to determine whether the positional requirements of the relevant analyzed object designate movement of the relevant object;

if said positional requirements of the relevant object designates that the relevant object is to move, a new displaying position of the relevant object is determined based on the movement designated by said positional requirements and the position of the relevant object when the relevant object was displayed in said frame image generated immediately before.

7. The recording medium according to claim 6, in judging said display position in said group of objects, where said object has already been displayed by the frame image generated immediately before, it is judged whether the time requirements of the analyzed relevant object designates limited duration of the relevant object;

if said time requirements of the relevant object designates limited display duration, it is judged whether the display of the relevant object should be extinguished based on the limited display duration designated by said time requirements;

and if it is judged that the object is to be extinguished, an image representing the relevant object cannot be generated.

8. The recording medium according to claim 5, wherein steps from said analysis step to said judgement step are executed by a part of a program common to said group of objects included in said program.

9. A game apparatus for displaying objects in a virtual space at a predetermined cycle, comprising;

a storage for storing parameters comprising movement information which defines a schedule from generation to extinction of each of a plurality of objects of different types and a movement pattern of each of the objects of different types, the parameters being common to all of the different types of objects, a judgement system that judges display timing of each object by referring to movement information stored in said storage corresponding to progression of a game, an acquisition system that acquires movement information of each object judged as being at the display timing, from said storage, a simulator that simulates movement of each object in accordance with the schedule and the movement pattern defined by the acquired movement information; and a display for displaying images of each object in accordance with the simulated movement.

10. A game apparatus according to claim 9, wherein said storage is stored with movement information including a generation position, direction of movement and amount of movement of objects defined as a movement pattern; and said simulator generates said object at the generation position defined by acquired movement information, when movement occurs, the simulator calculates the object position at every predetermined cycle based upon the amount of movement defined by said movement information and the direction defined by said movement information.

* * * * *